(12) United States Patent
Zhou

(10) Patent No.: US 11,521,414 B2
(45) Date of Patent: *Dec. 6, 2022

(54) METHOD FOR PREPARING POLYMER COMPOSITE MATERIAL AND DISPLAY PANEL FOR FINGERPRINT RECOGNITION

(71) Applicant: WUHAN CHINA STAR OPTOELECTRONICS TECHNOLOGY CO., LTD., Hubei (CN)

(72) Inventor: Yongxiang Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 704 days.

This patent is subject to a terminal disclaimer.

(21) Appl. No.: 16/471,483

(22) PCT Filed: Mar. 6, 2019

(86) PCT No.: PCT/CN2019/077081
§ 371 (c)(1),
(2) Date: Jun. 19, 2019

(87) PCT Pub. No.: WO2020/133695
PCT Pub. Date: Jul. 2, 2020

(65) Prior Publication Data
US 2021/0342563 A1    Nov. 4, 2021

(30) Foreign Application Priority Data

Dec. 29, 2018  (CN) .................. 201811637559.X

(51) Int. Cl.
*G06V 40/12*    (2022.01)
*C08L 23/06*    (2006.01)
(Continued)

(52) U.S. Cl.
CPC ........ *G06V 40/1306* (2022.01); *B06B 1/0688* (2013.01); *C08L 23/06* (2013.01);
(Continued)

(58) Field of Classification Search
CPC .............. G06V 40/1306; B06B 1/0688; B06B 2201/70; C08L 23/06; C08L 27/06; C08L 53/00; G02F 1/13338
See application file for complete search history.

(56) References Cited

U.S. PATENT DOCUMENTS 11,306,185 B2 *  4/2022  Zhou ..................... C08J 3/201
2013/0202831 A1   8/2013  Chhun et al.
(Continued)

FOREIGN PATENT DOCUMENTS

CN    101861352 A    10/2010
CN    103124770 A    5/2013
(Continued)

OTHER PUBLICATIONS

Study on dynamic mechanics of PVC/PE cross-linked blend system Song Mou-Dao, etc.

*Primary Examiner* — Stephen G Sherman
(74) *Attorney, Agent, or Firm* — PV IP PC; Wei Te Chung; Ude Lu

(57) ABSTRACT

A method for preparing a polymer composite material is provided. The method includes steps of mixing and heat-treating a first polymer, a second polymer, and a third polymer to obtain a first mixture, adding a light-transmitting material to the first mixture to obtain a second mixture, adding a nano material to the second mixture to obtain a third mixture, performing subsequent processing on the uniformly mixed third mixture to obtain the polymer composite material. The polymer composite material is configured to replace conventional protective glass in ultrasonic (Continued)

fingerprint recognition technology, and to improve accuracy of fingerprint recognition.

16 Claims, 6 Drawing Sheets

(51) Int. Cl.
    *C08L 27/06*     (2006.01)
    *C08L 53/00*     (2006.01)
    *G06V 40/13*     (2022.01)
    *B06B 1/06*     (2006.01)
    *G02F 1/1333*     (2006.01)

(52) U.S. Cl.
    CPC ............... *C08L 27/06* (2013.01); *C08L 53/00* (2013.01); *B06B 2201/70* (2013.01); *G02F 1/13338* (2013.01)

(56) References Cited

U.S. PATENT DOCUMENTS

| | | |
|---|---|---|
| 2014/0315016 A1 | 10/2014 | Dollase et al. |
| 2015/0152237 A1* | 6/2015 | Chen ........................ C08K 3/08 523/122 |
| 2016/0171270 A1 | 6/2016 | Lu et al. |

FOREIGN PATENT DOCUMENTS

| | | |
|---|---|---|
| CN | 104011161 A | 8/2014 |
| CN | 104553113 A | 4/2015 |
| CN | 107229901 A | 10/2017 |
| CN | 107245199 A | 10/2017 |
| CN | 107977602 A | 5/2018 |
| CN | 108921115 A | 11/2018 |
| KR | 20080017969 A | 2/2008 |

* cited by examiner

METHOD FOR PREPARING POLYMER COMPOSITE MATERIAL AND DISPLAY PANEL FOR FINGERPRINT RECOGNITION

FIELD OF INVENTION

This disclosure relates to fingerprint recognition technology, and more particularly, to a method for preparing a polymer composite material and a display panel for fingerprint recognition.

BACKGROUND OF INVENTION

Currently, ultrasonic fingerprint recognition technology has been widely used in various fields, such as mobile phones, computers, tablets, and access control systems for improving security of above-mentioned electronic products, because it is not affected by water and oil pollution and has strong environmental adaptability. Compared with conventional digital passwords, high efficiency of fingerprint unlocking brings a lot of convenience to people's lives.

However, recognition effect of an ultrasonic fingerprint recognition module currently used is not ideal. Because acoustic resistance of conventional protective glass of the module is between a fingerprint valley and a fingerprint ridge, and ultrasonic waves are reflected at an interface between the protective glass and fingers, reflectivity of the fingerprint valley and reflectivity of the fingerprint ridge is very close, and the contrast between the reflectivity of the fingerprint valley and the reflectivity of the fingerprint ridge is very small. That causes signal contrast and a signal-to-noise ratio of the fingerprint valley and the fingerprint ridge to be not high. It is difficult to process signals subsequently and is further difficult to accurately recognize textures of fingerprints.

SUMMARY OF INVENTION

The disclosure provides a method for preparing polymer composite material and display panel for fingerprint recognition. The composite material is used in a protective layer of an ultrasonic fingerprint recognition device to solve drawbacks of the contrast between the reflectivity of the fingerprint valley and the reflectivity of the fingerprint ridge is very small in the conventional ultrasonic fingerprint recognition module since the acoustic resistance of the conventional protective glass of the module is between the fingerprint valley and the fingerprint ridge, and ultrasonic wave is reflected at the interface between the protection glass and fingers. That causes a signal contrast between the fingerprint valley and the fingerprint ridge is not high. It is difficult to process signal subsequently and is further difficult to accurately recognize a texture of the fingerprint. That further generates a technical drawback of affecting sharpness of fingerprint image acquisition.

In order to solve the above-mentioned drawbacks, the disclosure provides a technical solution as follow.

The disclosure provides a method for preparing polymer composite material. The method comprises:

a step S10 of mixing and heat-treating a first polymer, a second polymer, and a third polymer to obtain a first mixture, wherein the first polymer and the second polymer are both selected from at least one material of the following groups: polymethyl methacrylate, polyvinyl chloride, polyethylene, polyurethane, polystyrene, polycarbonate, rubber, and nylon;

a step S20 of adding a light-transmitting material to the first mixture to obtain a second mixture, wherein the light-transmitting material is selected from one of the group consisting of magnesium fluoride, titanium oxide, lead sulfide, and lead selenide;

a step S30 of adding a nano material to the second mixture to obtain a third mixture;

a step S40 of performing a uniform mixing treatment to the third mixture; and a step S50 of performing subsequent processing on the uniformly mixed third mixture to obtain the polymer composite material.

In at least one embodiment of the disclosure, the third polymer is a block copolymer formed by reacting the first polymer with the second polymer.

In at least one embodiment of the disclosure, the first polymer is polyvinyl chloride, the second polymer is polyethylene, and the third polymer is a block copolymer of polyvinyl chloride-polyethylene.

In at least one embodiment of the disclosure, the first polymer has a molecular weight of 50,000 to 110,000 and a mass fraction of 5% to 90%, the second polymer has a molecular weight of 50,000 to 500,000 and a mass fraction of 5% to 90%, and the third polymer has a molecular weight of 10,000 to 100,000 and a mass fraction of 5% to 90% with respect to a total mass of the polymer composite material.

In at least one embodiment of the disclosure, the step S10 further comprises:

a step S101 of dissolving the first polymer in a first solvent at room temperature to obtain a first solution;

a step S102 of dissolving the second polymer in a second solvent at 60° C. to 120° C. to obtain a second solution;

a step S103 of dissolving the third polymer in a third solvent at 20° C. to 100° C. to obtain a third solution; and a step S104 of mixing the first solution, the second solution, and the third solution, and adding a surfactant to obtain the first mixture.

In at least one embodiment of the disclosure, the step S40 further comprises: performing a ultrasonic process to the third mixture for dispersing ingredients uniformly, wherein a period time of the ultrasonic processing is 1 to 3 hours, and a temperature is 60° C. to 100° C.; and the step S50 further comprises: performing a evaporating process to the third mixture at 80° C. to 120° C. after the third mixture is uniformly mixed to obtain the polymer composite material.

In at least one embodiment of the disclosure, the step S40 further comprises: adding the third mixture into a twin-screw extruder for blending and extruding, so that the third mixture is uniformly mixed, wherein a mixing temperature is 100° C. to 130° C., and a period time is 5 to 60 minutes; and the step S50 further comprises: cooling the third mixture after the third mixture is uniformly mixed to obtain the polymer composite material, wherein a cooling temperature is −10° C. to 10° C., and a period time is 10 to 120 seconds.

The disclosure further provides a method for preparing polymer composite material. The method comprises:

a step S10 of mixing and heat-treating a first polymer, a second polymer, and a third polymer to obtain a first mixture;

a step S20 of adding a light-transmitting material to the first mixture to obtain a second mixture;

a step S30 of adding a nano material to the second mixture to obtain a third mixture;

a step S40 of performing a uniform mixing treatment to the third mixture; and a step S50 of performing subsequent processing on the uniformly mixed third mixture to obtain the polymer composite material.

In at least one embodiment of the disclosure, the first polymer and the second polymer are both selected from at least one material of the following groups: polymethyl methacrylate, polyvinyl chloride, polyethylene, polyurethane, polystyrene, polycarbonate, rubber, and nylon.

In at least one embodiment of the disclosure, the third polymer is a block copolymer formed by reacting the first polymer with the second polymer.

In at least one embodiment of the disclosure, the first polymer is polyvinyl chloride, the second polymer is polyethylene, and the third polymer is a block copolymer of polyvinyl chloride-polyethylene.

In at least one embodiment of the disclosure, the first polymer has a molecular weight of 50,000 to 110,000 and a mass fraction of 5% to 90%, the second polymer has a molecular weight of 50,000 to 500,000 and a mass fraction of 5% to 90%, and the third polymer has a molecular weight of 10,000 to 100,000 and a mass fraction of 5% to 90% with respect to a total mass of the polymer composite material.

In at least one embodiment of the disclosure, the step S10 further comprises:

a step S101 of dissolving the first polymer in a first solvent at room temperature to obtain a first solution;

a step S102 of dissolving the second polymer in a second solvent at 60° C. to 120° C. to obtain a second solution;

a step S103 of dissolving the third polymer in a third solvent at 20° C. to 100° C. to obtain a third solution; and a step S104 of mixing the first solution, the second solution, and the third solution, and adding a surfactant to obtain the first mixture.

In at least one embodiment of the disclosure, the step S40 further comprises: performing a ultrasonic process to the third mixture for dispersing ingredients uniformly, wherein a period time of the ultrasonic processing is 1 to 3 hours, and a temperature is 60° C. to 100° C.; and the step S50 further comprises: performing a evaporating process to the third mixture at 80° C. to 120° C. after the third mixture is uniformly mixed to obtain the polymer composite material.

In at least one embodiment of the disclosure, the step S40 further comprises: adding the third mixture into a twin-screw extruder for blending and extruding, so that the third mixture is uniformly mixed, wherein a mixing temperature is 100° C. to 130° C., and a period time is 5 to 60 minutes; and the step S50 further comprises: cooling the third mixture after the third mixture is uniformly mixed to obtain the polymer composite material, wherein a cooling temperature is −10° C. to 10° C., and a period time is 10 to 120 seconds.

In at least one embodiment of the disclosure, the light-transmitting material is selected from one of the group consisting of magnesium fluoride, titanium oxide, lead sulfide, and lead selenide.

The disclosure further provides a display panel for fingerprint recognition. The display panel comprises an array substrate, a piezoelectric layer, and a protective layer. The piezoelectric layer is disposed on the array substrate. The piezoelectric layer comprises a lower electrode, a piezoelectric material layer, and an upper electrode sequentially disposed on the array substrate. The protective layer is disposed on the piezoelectric layer and in contact with a human body fingerprint. The protective layer material is a polymer composite material.

In at least one embodiment of the disclosure, the protective layer material is selected from at least one material of the following groups: polymethyl methacrylate, polyvinyl chloride, polyethylene, polyurethane, polystyrene, polycarbonate, rubber, and nylon.

In at least one embodiment of the disclosure, the display panel further comprises a touch layer and an adhesive layer.

In at least one embodiment of the disclosure, the adhesive layer is disposed between the touch layer and the array substrate.

The technical effects are as follows. The composite material prepared by the method for preparing polymer composite material of the disclosure is configured for using in the protective layer in the ultrasonic fingerprint recognition technology, and for replacing the conventional protective glass, so that the contrast between the reflectivity of the fingerprint valley and the reflectivity of the fingerprint ridge is improved. The difference in electrical signals between the fingerprint valley and the fingerprint ridge is improved, so that a fingerprint image is clear, and finally the accuracy of fingerprint recognition is improved.

DESCRIPTION OF DRAWINGS

In order to more clearly illustrate the embodiments of the present invention or the technical solutions in the prior art, the following briefly introduces the accompanying drawings used in the embodiments. Obviously, the drawings in the following description merely show some of the embodiments of the present invention. As regards one of ordinary skill in the art, other drawings can be obtained in accordance with these accompanying drawings without making creative efforts.

DETAILED DESCRIPTION OF PREFERRED EMBODIMENTS

Figure 1:
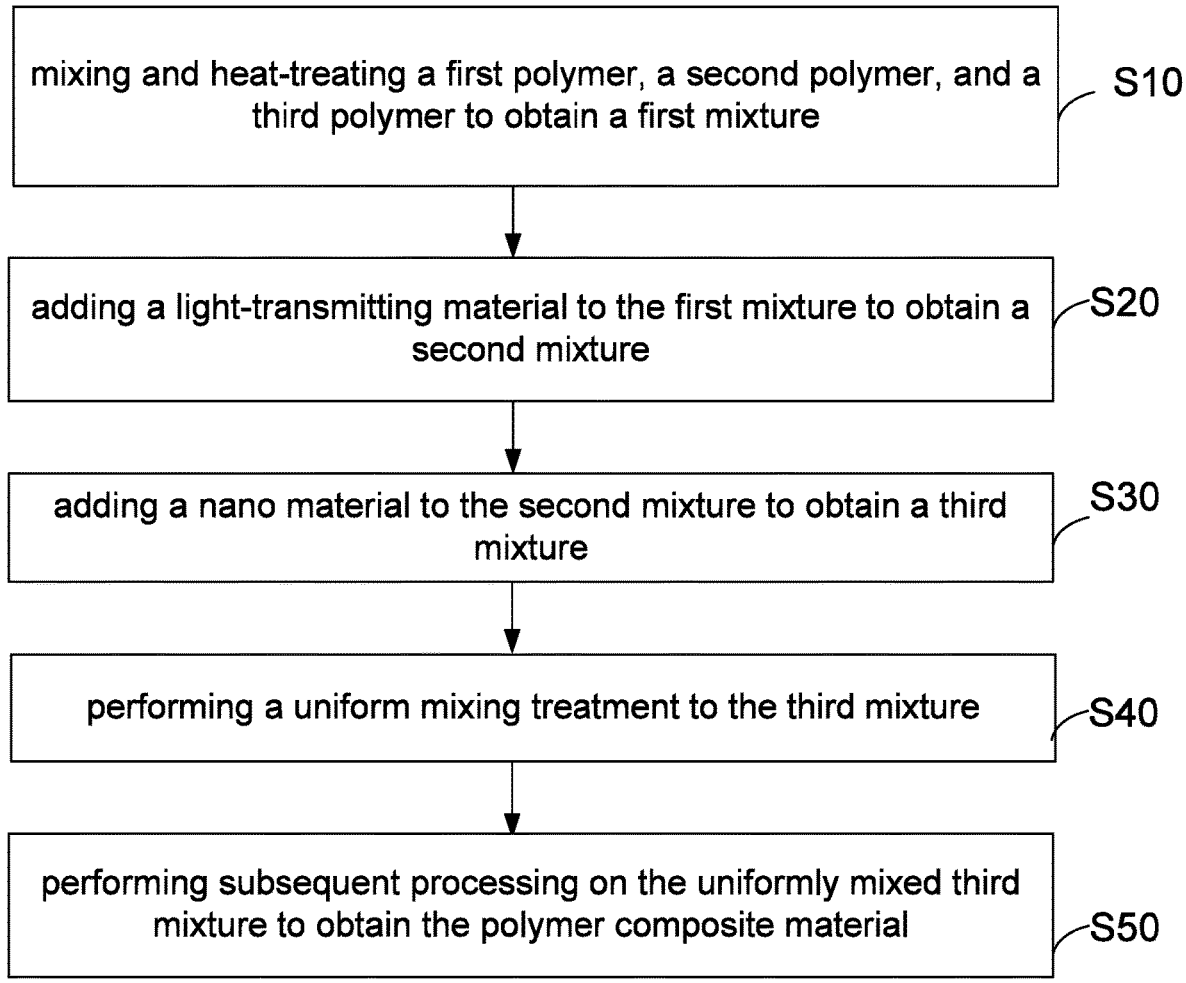
FIG. 1 is a flowchart of a method for preparing a polymer composite material of the present disclosure.

This description of the exemplary embodiments is intended to be read in connection with the accompanying drawings, which are to be considered part of the entire written description. In the description, terms such as "lower", "upper", "horizontal", "vertical", "above", "below", "up", "down", "top", and "bottom", as well as derivatives thereof, should be construed to refer to the orientation as then described or as shown in the drawing under discussion. These terms are for convenience of description and do not require that the apparatus be constructed or operated in a particular orientation, and do not limit the scope of the disclosure. Referring to the drawings of the disclosure, similar elements are labeled with the same number.

The disclosure is to improve conventional ultrasonic fingerprint recognition modules. The drawbacks of the conventional ultrasonic fingerprint recognition module is that the contrast between the reflectivity of the fingerprint valley and the reflectivity of the fingerprint ridge is very small in the conventional ultrasonic fingerprint recognition module since the acoustic resistance of the conventional protective glass of the module is between the fingerprint valley and the fingerprint ridge, and ultrasonic waves are reflected at the interface between the protection glass and fingers. That causes a signal contrast between the fingerprint valley and the fingerprint ridge to be not high. It is difficult to process signal subsequently and is further difficult to accurately recognize a texture of the fingerprint. That further generates a technical drawback of affecting sharpness of fingerprint image acquisition. This embodiment can solve the above-mentioned drawbacks.

The disclosure provides a method for preparing a polymer composite material. The method comprises:

a step S10 of mixing and heat-treating a first polymer, a second polymer, and a third polymer to obtain a first mixture;

a step S20 of adding a light-transmitting material to the first mixture to obtain a second mixture;

a step S30 of adding a nano material to the second mixture to obtain a third mixture;

a step S40 of performing a uniform mixing treatment to the third mixture; and a step S50 of performing subsequent processing on the uniformly mixed third mixture to obtain the polymer composite material.

In this embodiment, the first polymer and the second polymer are both selected from at least one material of the following groups: polymethyl methacrylate (PMMA), polyvinyl chloride (PVC), polyethylene (PE), polyurethane (PU), polystyrene (PS), polycarbonate (PC), rubber, and nylon. Acoustic resistance of the polymer composite material synthesized by the above-mentioned polymer is close to acoustic resistance of the fingerprint ridge, so reflectivity of the ultrasonic wave at the fingerprint ridge is very low, and most of the ultrasonic waves can be transmitted through a protective layer prepared by the polymer composite material. Besides, when the ultrasonic wave reaches the fingerprint valley, most of the ultrasonic waves will be reflected, so that a difference between the reflectivity of the fingerprint ridge and the reflectivity of the fingerprint valley is larger. Thus, a difference between different converted electrical signals is larger. Finally a clear image is formed, and accuracy of fingerprint recognition is improved.

In this embodiment, the method for preparing polymer composite material is described by taking PVC and PE as examples.

The first polymer is polyvinyl chloride (PVC), and the second polymer is polyethylene (PE). The third polymer is a block copolymer of polyvinyl chloride-polyethylene (PVC-PE).

The first polymer has a molecular weight of 50,000 to 110,000 and a mass fraction of 5% to 90%, the second polymer has a molecular weight of 50,000 to 500,000 and a mass fraction of 5% to 90%, and the third polymer has a molecular weight of 10,000 to 100,000 and a mass fraction of 5% to 90% with respect to a total mass of the polymer composite material.

Specifically, the step S10 further comprises: a step S101 of dissolving the first polymer in a first solvent at room temperature to obtain a first solution; a step S102 of dissolving the second polymer in a second solvent at 60° C. to 120° C. to obtain a second solution; a step S103 of dissolving the third polymer in a third solvent at 20° C. to 100° C. to obtain a third solution; and a step S104 of mixing the first solution, the second solution, and the third solution, and adding a surfactant to obtain the first mixture.

Specifically, the first solvent and the third solvent are both tetrahydrofuran (THF) solution, and the second solvent is a benzene solution. An adding amount of the solvent affects a dissolution rate and evaporation time of the polymer, and the specific adding amount is according to physical and chemical properties of the polymer. In the present embodiment, a mass ratio of the first polymer to the first solvent, a mass ratio of the second polymer to the second solvent, and a mass ratio of the third polymer to the third solvent are 1:3 to 1:10.

In the step S104, the added surfactant is stearic acid or sodium dodecyl benzene sulfonate, which reduces the surface tension of the mixed system and increases the solubility of the mixture.

In the step S20, the light-transmitting material is selected from one of the group consisting of magnesium fluoride, titanium oxide, lead sulfide, and lead selenide for increasing transmittance of the composite materials. The mass fraction of the light-transmitting material is from 1% to 5% with respect to the total mass of the composite material.

In the step S30, the nano material is selected from at least one material of the following groups: fullerenes, carbon nanotubes, montmorillonite, or other nanoparticles for improving the mechanical properties of the composite material. The mass fraction of the nano material is from 1% to 5% with respect to the total mass of the composite material.

The step S40 specifically comprises: performing an ultrasonic process to the third mixture for dispersing ingredients uniformly and for preventing the performance of the composite material from degrading due to molecular aggregation. A period time of the ultrasonic processing is 1 to 3 hours, and a temperature is 60° C. to 100° C.

The step S50 specifically comprises: performing a evaporating process to the third mixture at 80° C. to 120° C. after the third mixture is uniformly mixed to obtain the polymer composite material. Specifically, the third mixture is subjected to a rotary evaporation process such that the solvent in the third mixture is rapidly volatilized to inhibit crystallization of materials.

In this embodiment, respective polymers are separately dissolved by a solvent and then mixed, and finally impurities in the solvent are removed. In other embodiments, the respective polymers are directly mixed and heated, and mixed in a molten state.

In other embodiments, the S10 specifically comprises: mixing and heating the first polymer, the second polymer, and the third polymer at a heating temperature of 100° C. to 120° C., so that the polymers is in a molten state at a high temperature to obtain a first mixture.

The step S40 specifically comprises: adding the third mixture into a twin-screw extruder for blending and extruding, so that the third mixture is uniformly mixed, wherein a mixing temperature is 100° C. to 130° C., and a period time is 5 to 60 minutes.

The step S50 specifically comprises: cooling the third mixture after the third mixture is uniformly mixed to obtain the polymer composite material. A quenching method can be used for rapid cooling of the materials. A cooling temperature is −10° C. to 10° C., and a period time is 10 to 120 seconds.

Figure 2:
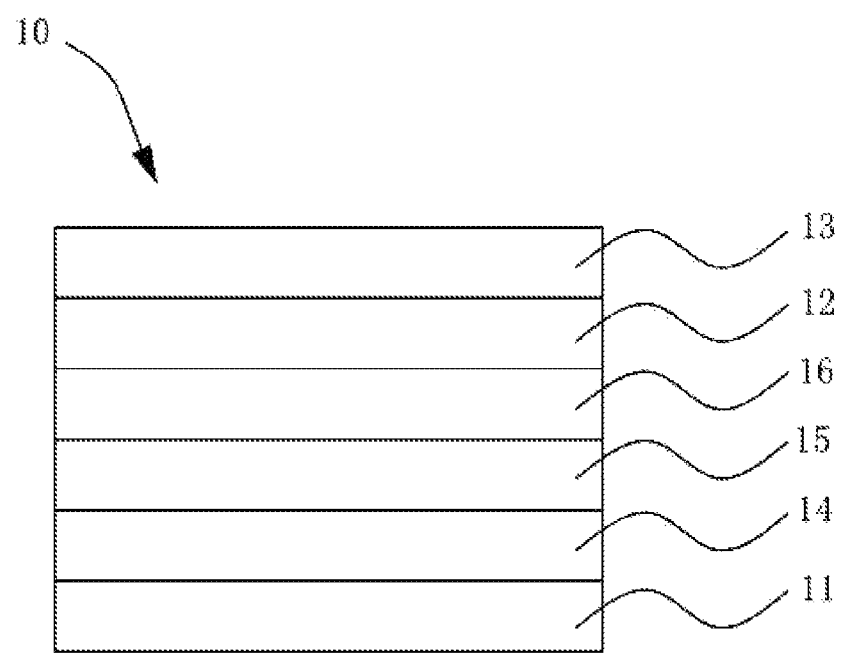
FIG. 2 is a schematic structural diagram of a display panel according to an embodiment of this disclosure.

Referring to FIG. 2, the disclosure further provides a display panel 10 for fingerprint recognition. The display panel 10 comprises an array substrate 11, a piezoelectric layer 12 disposed on the array substrate 11, and a protective layer 13 disposed on the piezoelectric layer 12.

In this embodiment, a flexible display panel as an example, the display panel 10 further comprises a display layer 14, an adhesive layer 15, and a touch layer 16 sequentially laminated between the array substrate 11 and the piezoelectric layer 12.

The array substrate 11 includes a plurality of thin film transistor arrays for controlling pixel switches, and inputting and outputting electrical signals to drive and process ultrasonic signals. The display layer 14 includes a plurality of pixel units arranged in an array for displaying images.

The touch layer 16 includes a plurality of touch sensing electrodes for implementing a touch function. The adhesive layer 15 is disposed between the touch layer 16 and the array substrate 11, and the adhesive layer 15 is configured for bonding the touch layer 16 with the array substrate 11. The adhesive layer 15 is optical glue.

The protective layer 13 is a polymer composite material prepared by the above-mentioned method. The polymer composite material is selected from at least one material of the following groups: polymethyl methacrylate, polyvinyl chloride, polyethylene, polyurethane, polystyrene, polycarbonate, rubber, and nylon.

Figure 3:
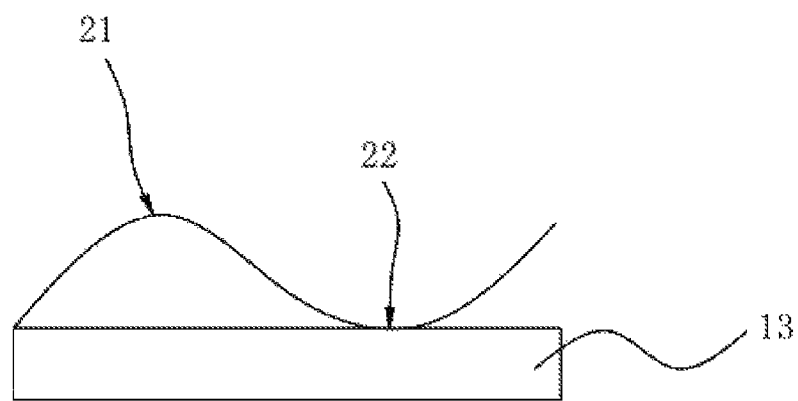
FIG. 3 is a schematic diagram of a fingerprint valley and fingerprint ridge in ultrasonic fingerprint recognition.

As shown in FIG. 3, sound pressure reflectance is determined by the acoustic resistance between the two materials on the interface. The protective layer 13 is configured for contacting a fingerprint of a human body. The acoustic resistance of the protective layer 13 is similar to the fingerprint ridge 21 of the finger, so that ultrasound has low reflectivity at the fingerprint ridge 21. That further makes the difference in reflectivity between the fingerprint valley 22 and the fingerprint ridge 21 improved. Finally, the difference in electrical signals between the fingerprint valley 22 and the fingerprint ridge 21 is improved, it can be more than doubled, and a clear fingerprint image is finally obtained.

A thickness of the protective layer 13 is less than 0.05 mm, which is much less than a thickness of a conventional protective glass (0.15 mm). The protective layer 13 can be customized according to different thicknesses of products due to the use of the polymer composite material, since the glass is difficult to be further processed by thinning treatment. In addition, the protective layer 13 comprises better light transmission properties and mechanical properties than the protective glass.

Figure 4:
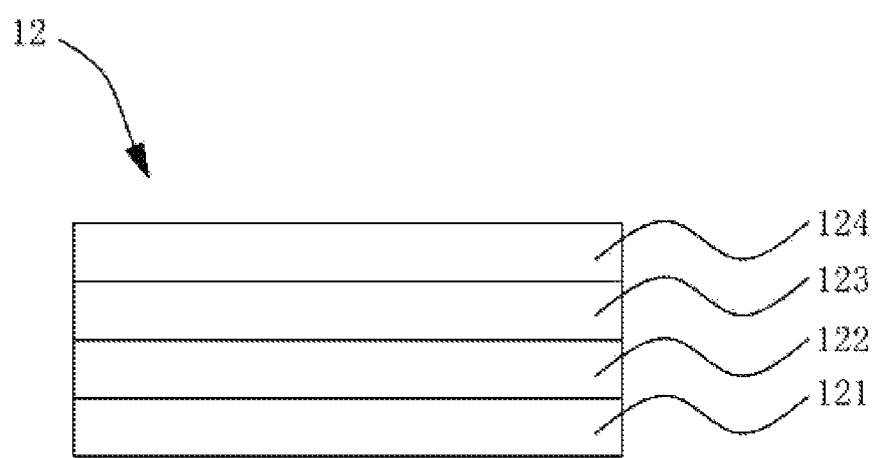
FIG. 4 is a schematic structural diagram of a piezoelectric layer according to a first embodiment of this disclosure.

As shown in FIG. 4, the piezoelectric layer 12 includes an insulating layer 121, a lower electrode 122, a piezoelectric material layer 123, and an upper electrode 124 sequentially laminated from bottom to top. The piezoelectric material layer 123 is prepared by full coating on a surface, which saves a lithography process and simplifies the processing technology. The piezoelectric layer 12 is disposed under the protective layer 13, the thickness that ultrasonic waves need to penetrate is reduced. The sound pressure and electrical signal strength of the ultrasonic wave are improved, thereby improving a signal to noise ratio and the accuracy of fingerprint recognition.

The upper electrode 124 and the lower electrode 122 are selected from one of metal, or alloys of silver, aluminum, molybdenum, gold, chromium, nickel, copper, platinum, and the like.

The piezoelectric layer 123 is made of polyvinylidene fluoride (PVDF), or the copolymer is a polyvinylidene fluoride-trifluoroethylene copolymer (PV DF-TrFE). The piezoelectric properties are oriented and regulated by adjusting the mass ratio of the copolymer. The piezoelectric property has a mass ratio ranging from (80:20) to (65:35), and in this embodiment, the mass ratio is 70:30. The piezoelectric properties of the material can be selected according to the requirements of the device.

Figure 5:
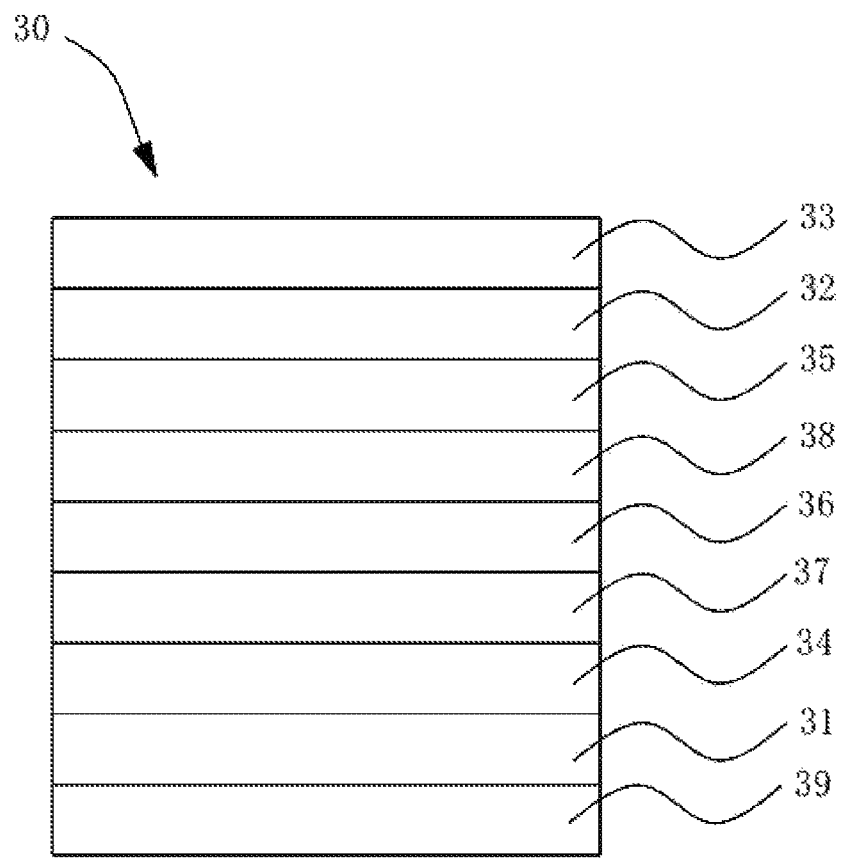
FIG. 5 is a schematic structural diagram of a display panel according to another embodiment of this disclosure.

In another embodiment, as shown in FIG. 5, a display panel 30 is a liquid crystal display panel. The display panel 30 comprises a lower polarizer plate 39, an array substrate 31, a liquid crystal layer 34, a color filter substrate 37, a touch layer 36, an upper polarizer plate 38, an adhesive layer 35, a piezoelectric layer 32, and a protective layer 33 sequentially laminated from bottom to top.

The touch layer 36 is disposed between the upper polarizer 38 and the color filter substrate 37 and is an on-cell structure.

The protective layer 33 and the piezoelectric layer 32 are the same as those in the first embodiment, and are not described herein again.

Figure 6:
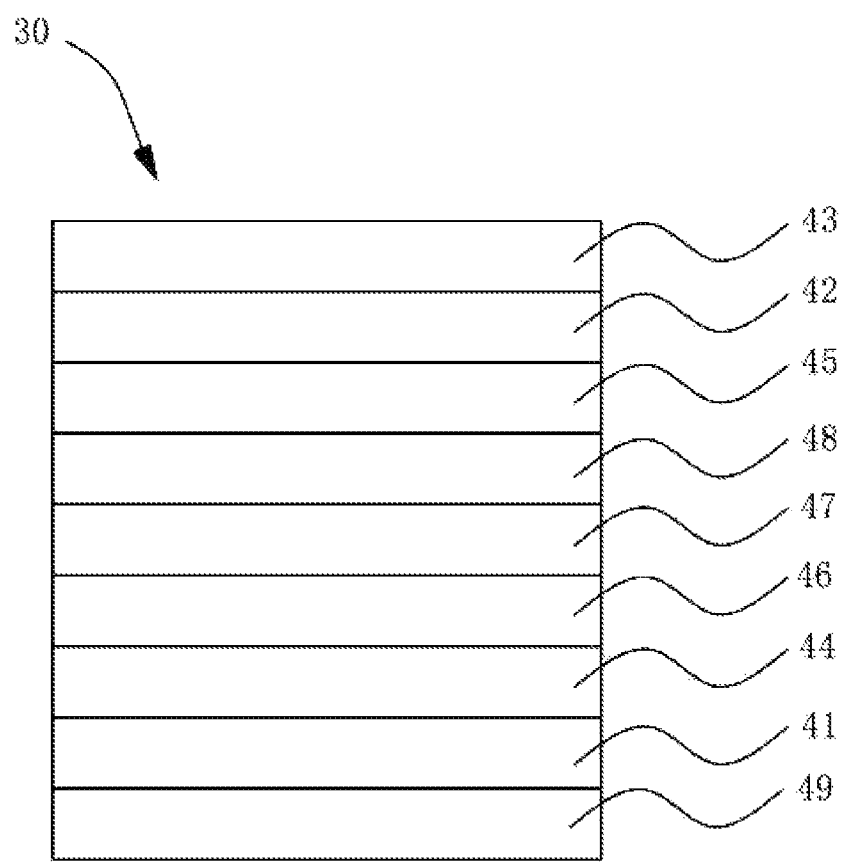
FIG. 6 is a schematic structural diagram of a display panel according to the other embodiment of this disclosure.

In other embodiments, as shown in FIG. 6, a display panel 40 comprises a lower polarizer plate 49, an array substrate 41, a liquid crystal layer 44, a touch layer 46, a color filter substrate 47, an upper polarizer plate 48, an adhesive layer 45, a piezoelectric layer 42, and a protective layer 43 sequentially laminated from bottom to top.

The touch layer 46 is disposed in the liquid crystal pixel and is an in-cell structure.

The protective layer 43 and the piezoelectric layer 42 are the same as those in the first embodiment, and are not described herein again.

The technical effects are as follows. The composite material prepared by the method for preparing the polymer composite material of the disclosure is configured to use in the protective layer in the ultrasonic fingerprint recognition technology, and to replace the conventional protective glass, so that contrast between the reflectivity of the fingerprint valley and the reflectivity of the fingerprint ridge is improved. The difference in electrical signals between the fingerprint valley and the fingerprint ridge is improved, so that a fingerprint image is clear, and finally the accuracy of fingerprint recognition is improved. In addition, the polymer material is lower in price, which can reduce the production cost, and the polymer material has better strength and toughness for prolonging the service life.

This disclosure has been described with preferred embodiments thereof, and it is understood that many changes and modifications to the described embodiment can be carried out without departing from the scope and the spirit of the invention.

What is claimed is:

1. A method for preparing a polymer composite material, comprising:
   a step S10 of mixing and heat-treating a first polymer, a second polymer, and a third polymer to obtain a first mixture, wherein the first polymer and the second polymer are both selected from at least one material of the following groups: polymethyl methacrylate, polyvinyl chloride, polyethylene, polyurethane, polystyrene, polycarbonate, rubber, and nylon;
   a step S20 of adding a light-transmitting material to the first mixture to obtain a second mixture, wherein the light-transmitting material is selected from one of the group consisting of magnesium fluoride, titanium oxide, lead sulfide, and lead selenide;
   a step S30 of adding a nano material to the second mixture to obtain a third mixture;
   a step S40 of performing a uniform mixing treatment to the third mixture; and
   a step S50 of performing subsequent processing on the uniformly mixed third mixture to obtain the polymer composite material.

2. The method for preparing the polymer composite material according to claim 1, wherein the third polymer is a block copolymer formed by reacting the first polymer with the second polymer.

3. The method for preparing the polymer composite material according to claim 2, wherein the first polymer is polyvinyl chloride, the second polymer is polyethylene, and the third polymer is a block copolymer of polyvinyl chloride-polyethylene.

4. The method for preparing the polymer composite material according to claim 3, wherein the first polymer has a molecular weight of 50,000 to 110,000 and a mass fraction of 5% to 90%, the second polymer has a molecular weight of 50,000 to 500,000 and a mass fraction of 5% to 90%, and the third polymer has a molecular weight of 10,000 to 100,000 and a mass fraction of 5% to 90% with respect to a total mass of the polymer composite material.

5. The method for preparing the polymer composite material according to claim 4, wherein the step S10 further comprises:
a step S101 of dissolving the first polymer in a first solvent at room temperature to obtain a first solution;
a step S102 of dissolving the second polymer in a second solvent at 60° C. to 120° C. to obtain a second solution;
a step S103 of dissolving the third polymer in a third solvent at 20° C. to 100° C. to obtain a third solution; and
a step S104 of mixing the first solution, the second solution, and the third solution, and adding a surfactant to obtain the first mixture.

6. The method for preparing the polymer composite material according to claim 5, wherein the step S40 further comprises: performing an ultrasonic process to the third mixture for dispersing ingredients uniformly, wherein a period time of the ultrasonic processing is 1 to 3 hours, and a temperature is 60° C. to 100° C.; and
wherein the step S50 further comprises: performing an evaporating process to the third mixture at 80° C. to 120° C. after the third mixture is uniformly mixed to obtain the polymer composite material.

7. The method for preparing the polymer composite material according to claim 4, wherein the step S40 further comprises:
adding the third mixture into a twin-screw extruder for blending and extruding, so that the third mixture is uniformly mixed, wherein a mixing temperature is 100° C. to 130° C., and a period time is 5 to 60 minutes; and
wherein the step S50 further comprises: cooling the third mixture after the third mixture is uniformly mixed to obtain the polymer composite material, wherein a cooling temperature is −10° C. to 10° C., and a period time is 10 to 120 seconds.

8. A method for preparing a polymer composite material, comprising:
a step S10 of mixing and heat-treating a first polymer, a second polymer, and a third polymer to obtain a first mixture;
a step S20 of adding a light-transmitting material to the first mixture to obtain a second mixture;
a step S30 of adding a nano material to the second mixture to obtain a third mixture;
a step S40 of performing a uniform mixing treatment to the third mixture; and
a step S50 of performing subsequent processing on the uniformly mixed third mixture to obtain the polymer composite material.

9. The method for preparing the polymer composite material according to claim 8, wherein the first polymer and the second polymer are both selected from at least one material of the following groups: polymethyl methacrylate, polyvinyl chloride, polyethylene, polyurethane, polystyrene, polycarbonate, rubber, and nylon.

10. The method for preparing the polymer composite material according to claim 9, wherein the third polymer is a block copolymer formed by reacting the first polymer with the second polymer.

11. The method for preparing the polymer composite material according to claim 10, wherein the first polymer is polyvinyl chloride, the second polymer is polyethylene, and the third polymer is a block copolymer of polyvinyl chloride-polyethylene.

12. The method for preparing the polymer composite material according to claim 11, wherein the first polymer has a molecular weight of 50,000 to 110,000 and a mass fraction of 5% to 90%, the second polymer has a molecular weight of 50,000 to 500,000 and a mass fraction of 5% to 90%, and the third polymer has a molecular weight of 10,000 to 100,000 and a mass fraction of 5% to 90% with respect to a total mass of the polymer composite material.

13. The method for preparing the polymer composite material according to claim 12, wherein the step S10 further comprises:
a step S101 of dissolving the first polymer in a first solvent at room temperature to obtain a first solution;
a step S102 of dissolving the second polymer in a second solvent at 60° C. to 120° C. to obtain a second solution;
a step S103 of dissolving the third polymer in a third solvent at 20° C. to 100° C. to obtain a third solution; and
a step S104 of mixing the first solution, the second solution, and the third solution, and adding a surfactant to obtain the first mixture.

14. The method for preparing the polymer composite material according to claim 13, wherein the step S40 further comprises: performing an ultrasonic process to the third mixture for dispersing ingredients uniformly, wherein a period time of the ultrasonic processing is 1 to 3 hours, and a temperature is 60° C. to 100° C.; and
wherein the step S50 further comprises: performing a evaporating process to the third mixture at 80° C. to 120° C. after the third mixture is uniformly mixed to obtain the polymer composite material.

15. The method for preparing the polymer composite material according to claim 12, wherein the step S40 further comprises:
adding the third mixture into a twin-screw extruder for blending and extruding, so that the third mixture is uniformly mixed, wherein a mixing temperature is 100° C. to 130° C., and a period time is 5 to 60 minutes; and
wherein the step S50 further comprises: cooling the third mixture after the third mixture is uniformly mixed to obtain the polymer composite material, wherein a cooling temperature is −10° C. to 10° C., and a period time is 10 to 120 seconds.

16. The method for preparing the polymer composite material according to claim 12, wherein the light-transmitting material is selected from one of the group consisting of magnesium fluoride, titanium oxide, lead sulfide, and lead selenide.

* * * * *